US010789989B2

United States Patent
Takada et al.

(10) Patent No.: US 10,789,989 B2
(45) Date of Patent: Sep. 29, 2020

(54) VIDEO RECORDING APPARATUS AND VIDEO RECORDING METHOD

(71) Applicant: HITACHI KOKUSAI ELECTRIC INC., Tokyo (JP)

(72) Inventors: Tomomi Takada, Tokyo (JP); Shigeyuki Murata, Tokyo (JP); Satoshi Kasai, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 40 days.

(21) Appl. No.: 15/532,114

(22) PCT Filed: Dec. 1, 2015

(86) PCT No.: PCT/JP2015/083707
§ 371 (c)(1),
(2) Date: Jun. 1, 2017

(87) PCT Pub. No.: WO2016/088741
PCT Pub. Date: Jun. 9, 2016

(65) Prior Publication Data
US 2017/0270975 A1    Sep. 21, 2017

(30) Foreign Application Priority Data
Dec. 1, 2014 (JP) .................... 2014-243154

(51) Int. Cl.
*G11B 27/32* (2006.01)
*H04N 5/91* (2006.01)
(Continued)

(52) U.S. Cl.
CPC ...... *G11B 27/327* (2013.01); *G08B 13/19667* (2013.01); *G11B 20/10* (2013.01);
(Continued)

(58) Field of Classification Search
CPC ... G11B 27/327; G11B 20/10; G11B 20/1217; G11B 27/00; G11B 27/3027; G11B 27/36
See application file for complete search history.

(56) References Cited

U.S. PATENT DOCUMENTS 5,724,474 A * 3/1998 Oguro ................ G11B 20/1251
386/246
6,011,897 A * 1/2000 Koyama ................ G11B 20/12
386/241
(Continued)

FOREIGN PATENT DOCUMENTS

JP   H08-111080 A   4/1996
JP   H11-162145 A   6/1999
(Continued)

OTHER PUBLICATIONS

Extended European Search Report dated May 15, 2018 issued in corresponding European Patent Application No. 15865897.1.
International Search Report dated Feb. 16, 2016.

*Primary Examiner* — Mishawn N. Hunter
(74) *Attorney, Agent, or Firm* — Bacon&Thomas, PLLC

(57) ABSTRACT

A video recording apparatus includes a recording device having a location information area and a video data area. The location information area stores location information of video data stored in the video data area. The video data area stores the video data in units of blocks with a size of 1 MB or greater. The tail end of the block is used as a table of contents region for storing table of contents information of a plurality of the most-recent blocks. By providing the table of contents regions at a predetermined frequency, the tables of contents of all blocks being used in the video data area are retained in a distributed and redundant manner. Whenever the power supply is re-activated, the tables of contents (Continued)

regions are read, and pieces of the table of contents information are joined appropriately to construct a complete table of contents in memory.

9 Claims, 12 Drawing Sheets

(51) Int. Cl.
*G11B 20/10* (2006.01)
*H04N 5/915* (2006.01)
*H04N 5/76* (2006.01)
*G11B 27/30* (2006.01)
*G08B 13/196* (2006.01)
*G11B 20/12* (2006.01)
*H04N 7/18* (2006.01)

(52) U.S. Cl.
CPC ...... *G11B 20/1217* (2013.01); *G11B 27/3027* (2013.01); *H04N 5/76* (2013.01); *H04N 5/91* (2013.01); *H04N 5/915* (2013.01); *G08B 13/19676* (2013.01); *H04N 7/181* (2013.01)

(56) References Cited

U.S. PATENT DOCUMENTS

| | | |
|---|---|---|
| 6,272,081 B1 | 8/2001 | Murata |
| 6,378,031 B1 | 4/2002 | Kuno et al. |
| 2003/0123852 A1* | 7/2003 | Takahashi ............ G11B 27/107 386/243 |
| 2004/0244055 A1 | 12/2004 | Takada et al. |
| 2005/0076176 A1 | 4/2005 | Takada et al. |
| 2006/0117241 A1 | 6/2006 | Ko et al. |
| 2007/0041719 A1 | 2/2007 | Takada |
| 2010/0020175 A1 | 1/2010 | Takada |
| 2011/0123169 A1* | 5/2011 | Liu ........................ H04N 5/765 386/241 |
| 2011/0274174 A1* | 11/2011 | Francois .............. H04N 19/159 375/240.16 |
| 2012/0163779 A1* | 6/2012 | Dachiku ............ H04N 21/2365 386/355 |
| 2013/0173819 A1* | 7/2013 | Lee .................. H04N 21/23418 709/231 |
| 2014/0081989 A1* | 3/2014 | Chang ............... G06F 17/30569 707/748 |

FOREIGN PATENT DOCUMENTS

| | | |
|---|---|---|
| JP | 2000-020365 A | 1/2000 |
| JP | 2004-220355 A | 8/2004 |
| JP | 4237549 B2 | 3/2009 |
| JP | 4401132 B2 | 1/2010 |
| JP | 2010-028754 A | 2/2010 |
| JP | 4583270 B2 | 11/2010 |
| JP | 2011-087080 A | 4/2011 |
| WO | WO2003_030173 A2 | 4/2003 |

* cited by examiner

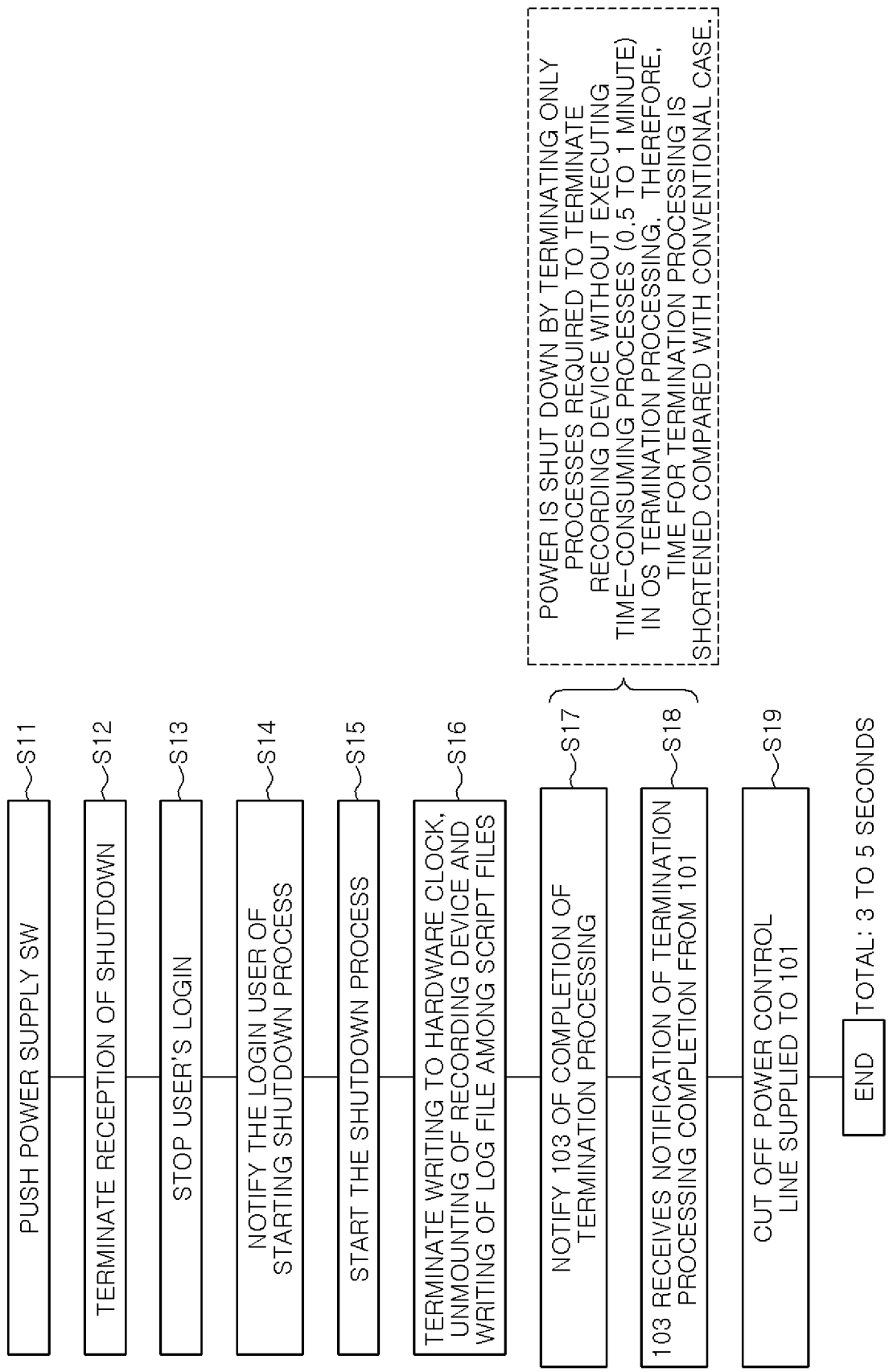

VIDEO RECORDING APPARATUS AND VIDEO RECORDING METHOD

TECHNICAL FIELD

The present invention relates to a video recording apparatus using a random access storage medium such as a hard disk.

BACKGROUND ART

Conventionally, there has been known a circulating recording apparatus for recording images of a surveillance camera (see, e.g., Patent Documents 1 to 3).

FIG. 3 is a schematic diagram of a file system in a conventional circulating recording apparatus described in Patent Document 1 and the like.

The circulating file system is built on a recording device 15 and includes an arrangement information area 30, an index information area 31 and a video data area 32.

One unit of the index information area 31 is index information 33, and one unit of the video data area 32 is video MB block (Mega-Byte block) 34. The index information 33 and the video MB block 34 are in one-to-one correspondence.

The index information area 31 and the video data area 32 are subdivided for each camera (channel). In this example, corresponding to three cameras A to C, areas 31-1 to 31-3 are allocated as index information, and areas 32-1 to 32-3 are allocated as video data, respectively.

The arrangement information area 30 stores arrangement information about an address (e.g., logical block address (LBA)) indicating a location at which each video MB block of each camera area is arranged on the recording device.

As a general rule, each of the arrangement information area 30, the index information area 31 and the video data area is arranged so as to be continuous in an address space. For example, the areas 31-1 and 32-1 forming a pair are separated from each other by addresses (and physically as well).

FIG. 4 is a diagram illustrating a relationship between the index information 33 and the video MB block 34 in the conventional circulating recording apparatus.

The index information 33 has a fixed length of 32 bytes and the video MB block 34 has a fixed length of 1 MB or more.

The video MB block 34 includes a plurality of video frame data 342 for one frame, and a row of the plurality of video frame data 342 is divided into a plurality of packs 343-1 to 343-4.

Meanwhile, the index information 33 includes fields of a start frame number 331, a flag area 332, a start frame time 333, pack start addresses 334-1 to 334-Q, and in-pack frame numbers 335-1 to 335-Q. Q is a maximum value of the number of sub-blocks (the number of packs) of the video MB block, and is set to 10.

The start frame number 331 indicates a frame number of the first video data of the video MB block 34 to be paired. The frame number is a monotonically increasing value which is managed independently by this file system and is set to 0 when the camera area 31 is created.

The flag area 332 stores a flag indicating a state of the index information 33. The state indicates whether the video MB block to be paired exists or whether it is a dummy value created by estimation from the index information before and after repair processing.

The start frame time 333 indicates a video time of the first video data of the video MB block 34 to be paired.

The pack start address 334 and the in-pack frame number 335 have a size of 1 byte (Octet), are arranged alternately, and indicate a relative pack start position in the video MB block and the number of frames, respectively. The size (number of bytes) of the pack of interest is obtained by a difference between an address of the current pack and an address of the next pack.

Further, in an MB block header 341 of the video MB block 34, there is index information 33-b of the video MB block which holds exactly the same data as the index information 33.

The circulating recording apparatus records the video in units of the video MB block 34. That is, after at least one piece of write data (including index information) corresponding to the video MB block 34 is prepared, it is written at once. On the other hand, the index information 33 is written to the recording device at a lower frequency than the video MB block 34. That is, a plurality of pieces of the index information 33 is collectively updated at once.

As another prior art, Patent Document 4 discloses a technique in which video and audio data is distributed and recorded in a plurality of video recording terminals so that video and audio data from a plurality of video output means can be recorded without being limited to the maximum recordable rate to the storage medium of one terminal, and by distributing and recording a series of video and audio data in a plurality of terminals in the smallest unit that can be played back, it is possible to suppress a possibility that all data cannot be referenced even if the terminal in which video and audio data is recorded breaks down.

In addition, Patent Document 5 discloses a technique in which since position information of a sector group in an optical disk is divided for each predetermined amount of information and distributed to a plurality of sectors in the sector group, an overhead can be reduced, and it is possible to improve the reliability of position information detection by reducing an influence of a local defect.

PRIOR ART DOCUMENTS

Patent Document 1: Japanese Patent No. 4237549
Patent Document 2: Japanese Patent No. 4401132
Patent Document 3: Japanese Patent No. 4583270
Patent Document 4: Japanese Patent No. 4554111
Patent Document 5: Japanese Patent Application Publication No. 2011-103174
Patent Document 6: U.S. Pat. No. 6,636,879

SUMMARY OF THE INVENTION

In the conventional video recording apparatus, if the power supply is cut off while failing to perform termination processing, inconsistency between the index information and the video data may occur. When the power supply is turned on again, the recorded data is checked and restoration is carried out if necessary. However, since the restoration time is indefinite, it may take a considerable amount of time until the start of recording.

In view of the above, an object of the present invention is to shorten the time from when the power supply is turned on again after the power supply is cut off to the start of recording in a video recording apparatus operating for a long time.

In accordance with an aspect of the present invention, there is provided a video recording apparatus including a recording device having an arrangement information area and a video data area, wherein the arrangement information area stores arrangement information of video data stored in the video data area, and the video data area stores video data and index information of the video data in an index area at the end of the video data.

Further, the index information may be stored in the index area of the video data area in order from the oldest to the latest.

Further, a plurality of pieces of the index information may be stored in one video data area.

In accordance with another aspect of the present invention, there is provided a video recording method of a video recording apparatus including a recording device having an arrangement information area and a video data area. The method includes: setting an arrangement information area and a video data area in the recording device; storing video data in the video data area and storing index information of the video data in an index area at an end of the video data; and storing arrangement information of the video data stored in the video data area in the arrangement information area.

Further, in the video recording method of the video recording apparatus of the present invention, the index information may be stored in the index area of the video data area in order from the oldest to the latest.

EFFECT OF THE INVENTION

According to the present invention, it is possible to shorten the time from when the power supply is turned on again after the power supply is cut off to the start of recording.

BRIEF DESCRIPTION OF THE DRAWINGS

FIG. 11 shows a flow of termination processing of the video recording apparatus of the third embodiment.

DETAILED DESCRIPTION

Hereinafter, embodiments of the present invention will be described with reference to the drawings.

First Embodiment

Figure 1:
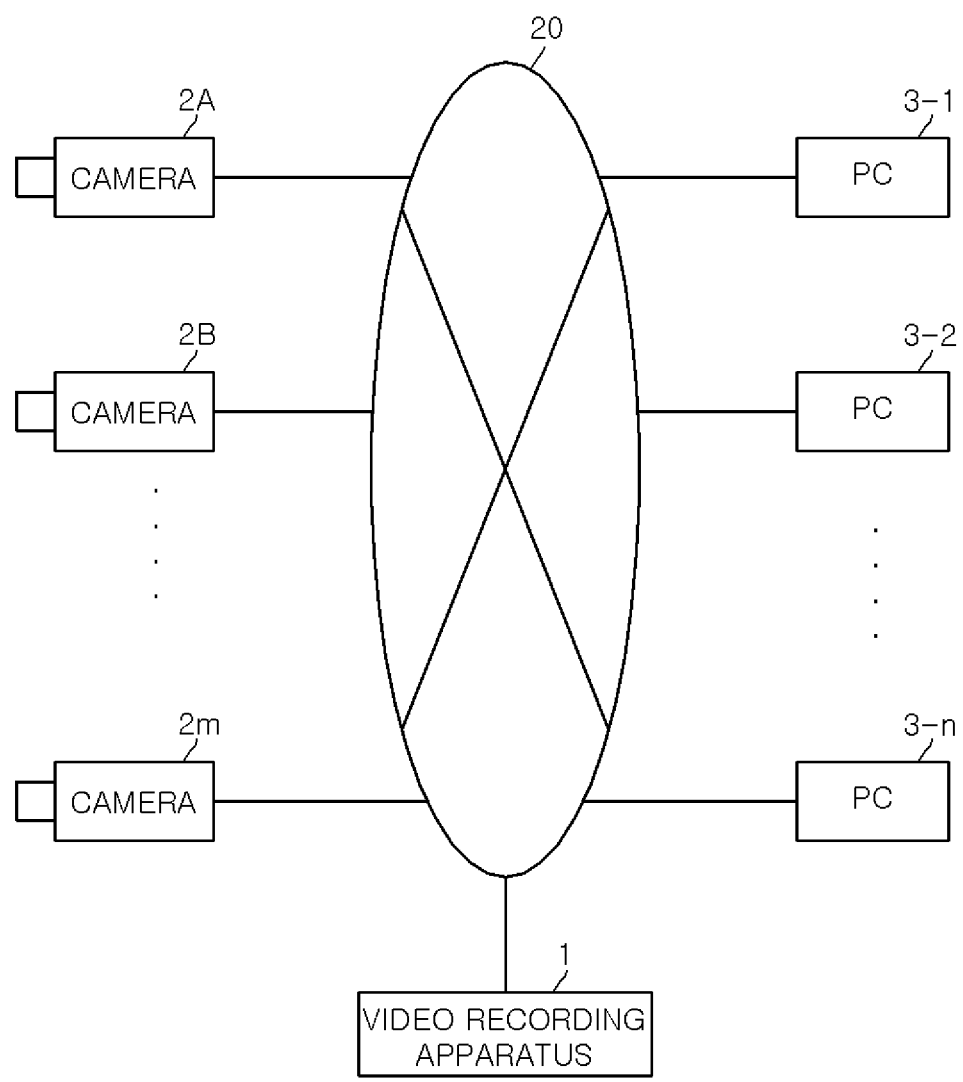
FIG. 1 is a configuration diagram of a monitoring system including a video recording apparatus according to a first embodiment.

FIG. 1 is a block diagram of a monitoring system including a video recording apparatus according to a first embodiment.

In the monitoring system shown in FIG. 1, a video recording apparatus 1 such as a network digital recorder (NDR), cameras 2A, 2B, . . . , 2m and display operation devices such as personal computers (PCs) 3-1 to 3-n are connected via a network 20.

The m cameras 2A to 2m are network type cameras capable of delivering video data to the network 20.

The PCs 3-1 to 3-n may control the settings of the video recording apparatus 1 and the cameras 2A to 2m, and reproduce the recorded data of the video recording apparatus 1.

Figure 2:
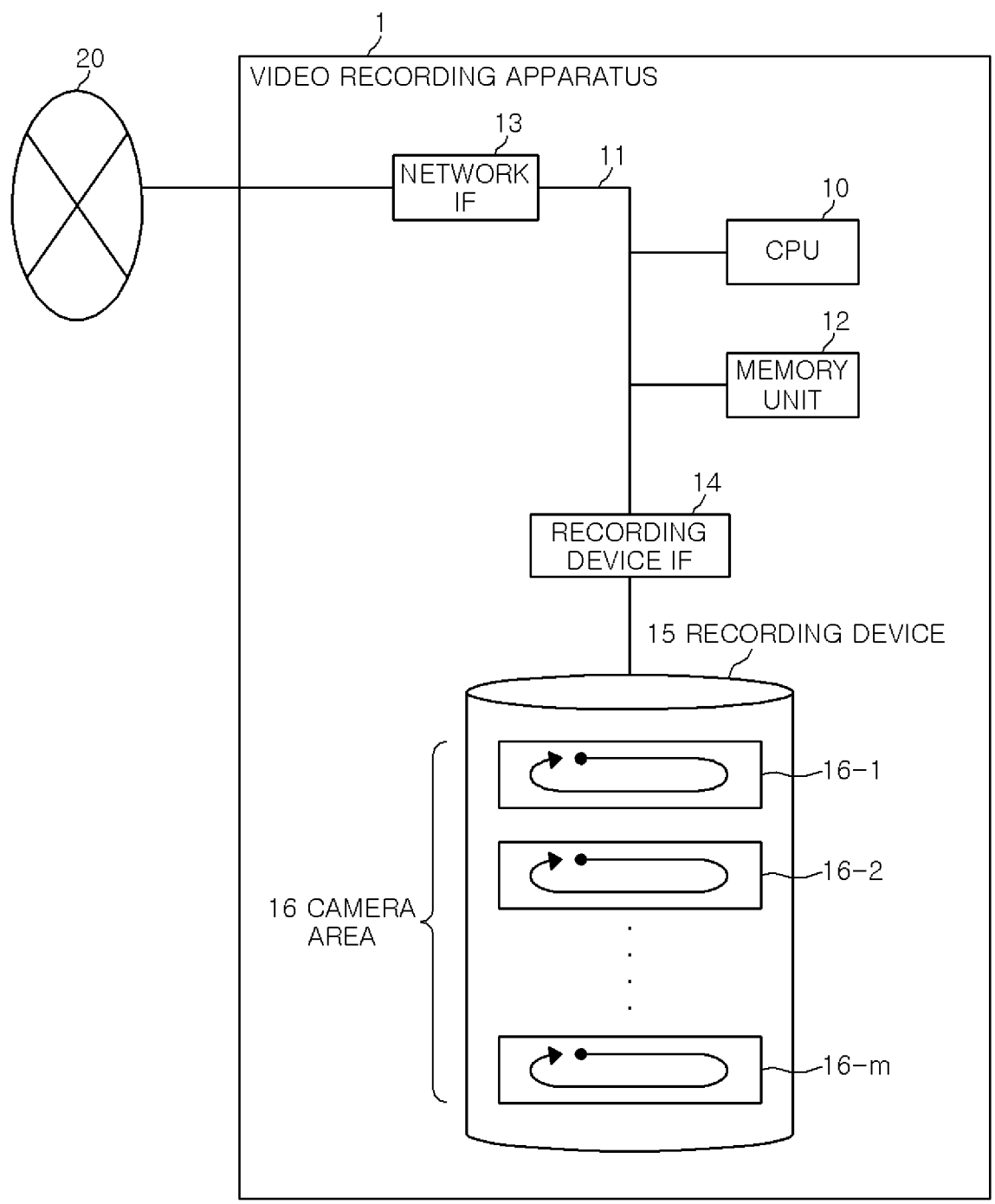
FIG. 2 is a block diagram of the video recording apparatus according to the first embodiment.

FIG. 2 is a block diagram of the video recording apparatus 1.

In the video recording apparatus 1, a central processing unit (CPU) 10, a memory unit 12, a network interface (IF) 13, and a recording device IF 14 are connected to an internal bus 11.

The memory unit 12 has a main memory and an auxiliary storage device (e.g., a flash memory) that holds an operating system (OS) or the like.

A recording device 15 is connected to the recording device IF 14. The recording device 15 is a hard disk drive (HDD), a solid state drive (SSD) or the like, and is treated as a block device from the OS.

In the recording device 15, logical areas are provided for the number of cameras to be recorded. The logical area for each camera is collectively referred to as a camera area 16. In FIG. 2, the camera area 16 includes m camera areas 16-1 to 16-m corresponding to the number of cameras to be recorded.

Circulation recording is performed on the camera area 16. Addresses are assigned to the camera area, and video data is written starting from a start address. When a write destination address reaches a final address, video data is overwritten and stored sequentially from the start address.

Figure 5:
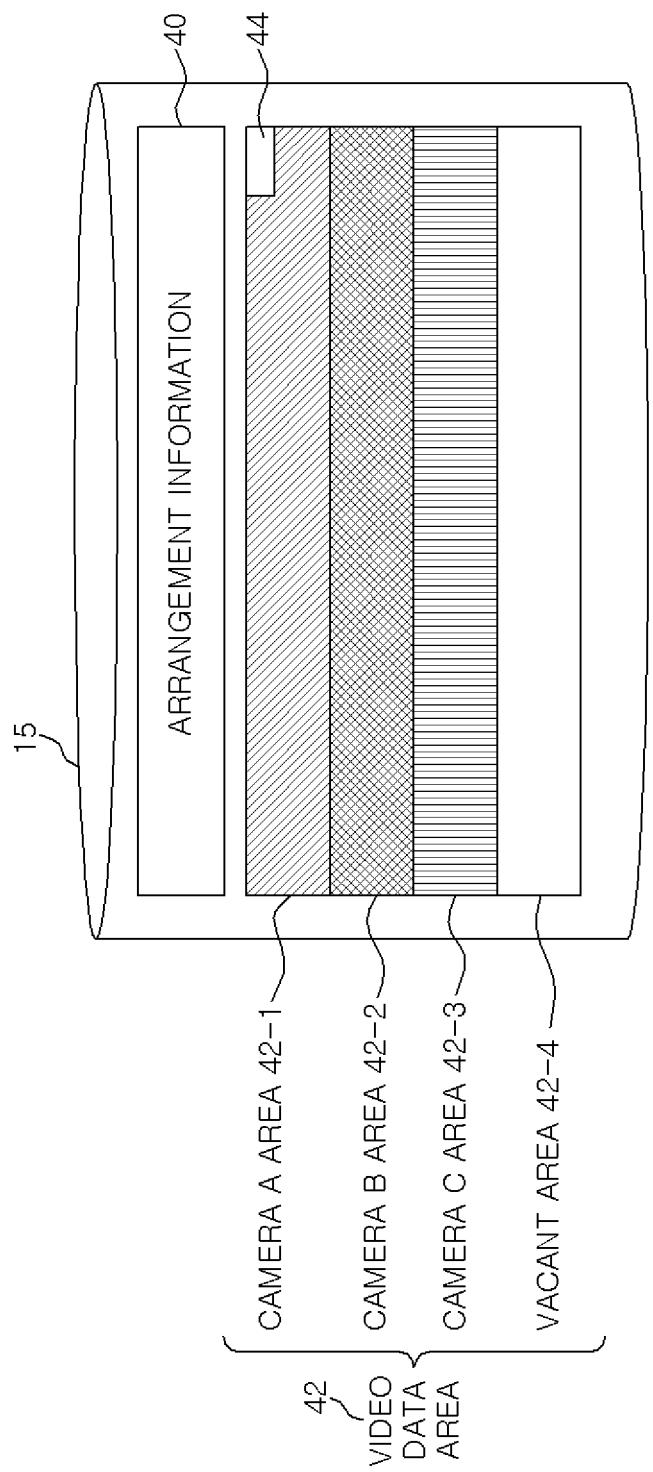
FIG. 5 is a diagram illustrating a file system of a recording device 15 according to the first embodiment.

FIG. 5 is a diagram explaining a file system of the recording device 15.

Figure 3:
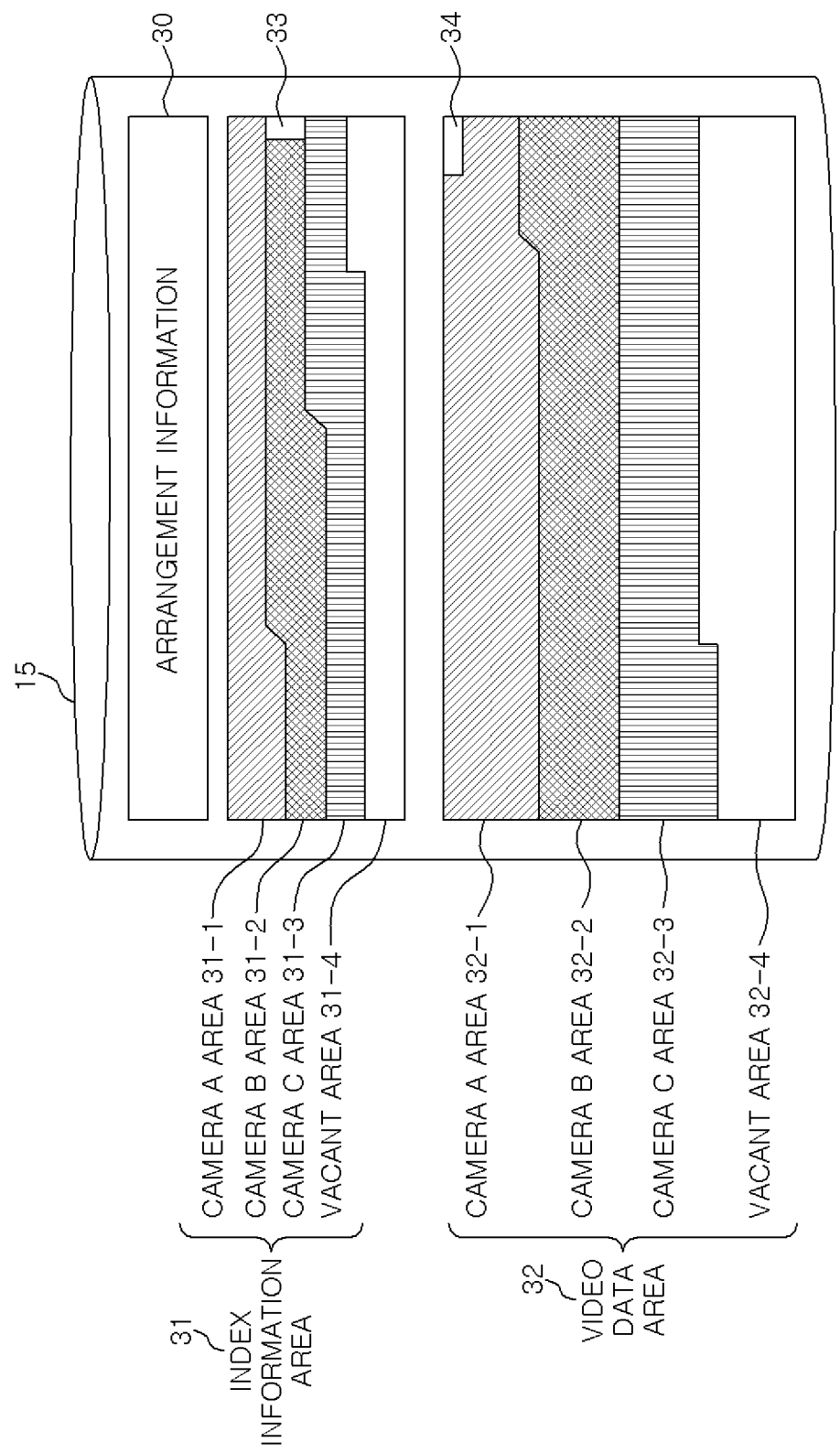
FIG. 3 is a diagram illustrating a circulating file system of a recording device in a conventional video recording apparatus.

In the recording device 15 of FIG. 5, a circulating file system is constructed. The circulating file system includes mainly two areas, i.e., an arrangement information area 40 and a video data area 42. A difference between FIG. 5 and FIG. 3 is that an index information area is incorporated into the video data area from an independent area.

The video data area 42 includes a set of MB blocks, and is divided into areas corresponding to the respective cameras. In the video data area 42, there are a video data area 42-1 for camera A, a video data area 42-2 for camera B, a video data area 42-3 for camera C, and a vacant area 42-4. The capacity of the camera area is obtained by multiplying the number of MB blocks allocated to each camera by the MB block size. For convenience, the number of MB blocks is treated to be equal to the capacity of the camera area.

The arrangement information area 40 holds information on a recording position of each video MB block in the video data area 42. The arrangement information area 40 must hold information on the MB block of the camera area to which each MB block of each recording device has been allocated in order to perform recording on a plurality of recording devices in a traversed or distributed manner. The former is referred to as an in-device MB block number and the latter is referred to as an in-camera-area MB block number.

The circulating file system according to the present embodiment, at an initialization stage, divides an internal space of the recording device 15 into units of a specified MB block size, and assigns the in-device MB block number in ascending order starting from 0. Device numbers of several bits are assigned to a plurality of recording devices that can be used at the same time and stored in association with unique numbers.

Also in each camera area, the in-camera-area MB block number is assigned as a number indicating the order of use within the camera area. The in-camera-area MB block number starts from 0 and ends at (number of blocks for camera area capacity–1). When video data is recorded, it is recorded in order of the in-camera-area MB block numbers.

If the internal space of the device is equally divided regardless of the presence of bad sectors and numbered sequentially from the start address, the in-device MB block number can be generated if there is information on the start address, the division size, and the division number. Further, the bad sectors may be replaced with alternative sectors by the management of the firmware of the recording device 15 itself, and can also be avoided by disabling the video MB block including the bad sector by the circulating file system.

If the in-camera-area MB block number is also simply assigned in ascending order, the in-camera-area MB block number can be generated if there is offset information with the in-device MB block number.

Alternatively, all pairs of the in-device MB block numbers (including device numbers) and the in-camera-area MB block numbers may be held as a table. The in-camera-area MB block number with a particular value may be used to indicate that the corresponding in-device MB block number is unused.

A video MB block 44 is a unit constituting the video data area 42, has a fixed length size of 1 MB or even MB, and stores video data of about 150 frames depending on the encoding rate. Storage is performed on a frame basis, and the video data of one frame is not stored while being divided in a plurality of video MB blocks 44. By increasing this unit up to megabytes, it is possible to continuously read out sectors in the unit and reduce the number of seeks when performing simultaneous recording and reading on a plurality of camera videos, so that the performance (number of simultaneous recordings, lifetime, etc.) is improved. Even if it does not have a sub-block structure called a pack, there may be a remainder less than the size of one frame at the end of the video MB block 44.

In this embodiment, cyclic writing is realized by using the MB block in the camera area from the beginning in order of the in-camera-area MB block numbers, and using the MB block from the beginning when reaching the end.

In this embodiment, a concept of accumulated MB block number may be introduced. This is the MB block number accumulated in the camera area, indicates the n-th MB block to which the writhing has been done since the camera area was created, and is not affected by an update of the MB block at the storage destination.

Figure 6:
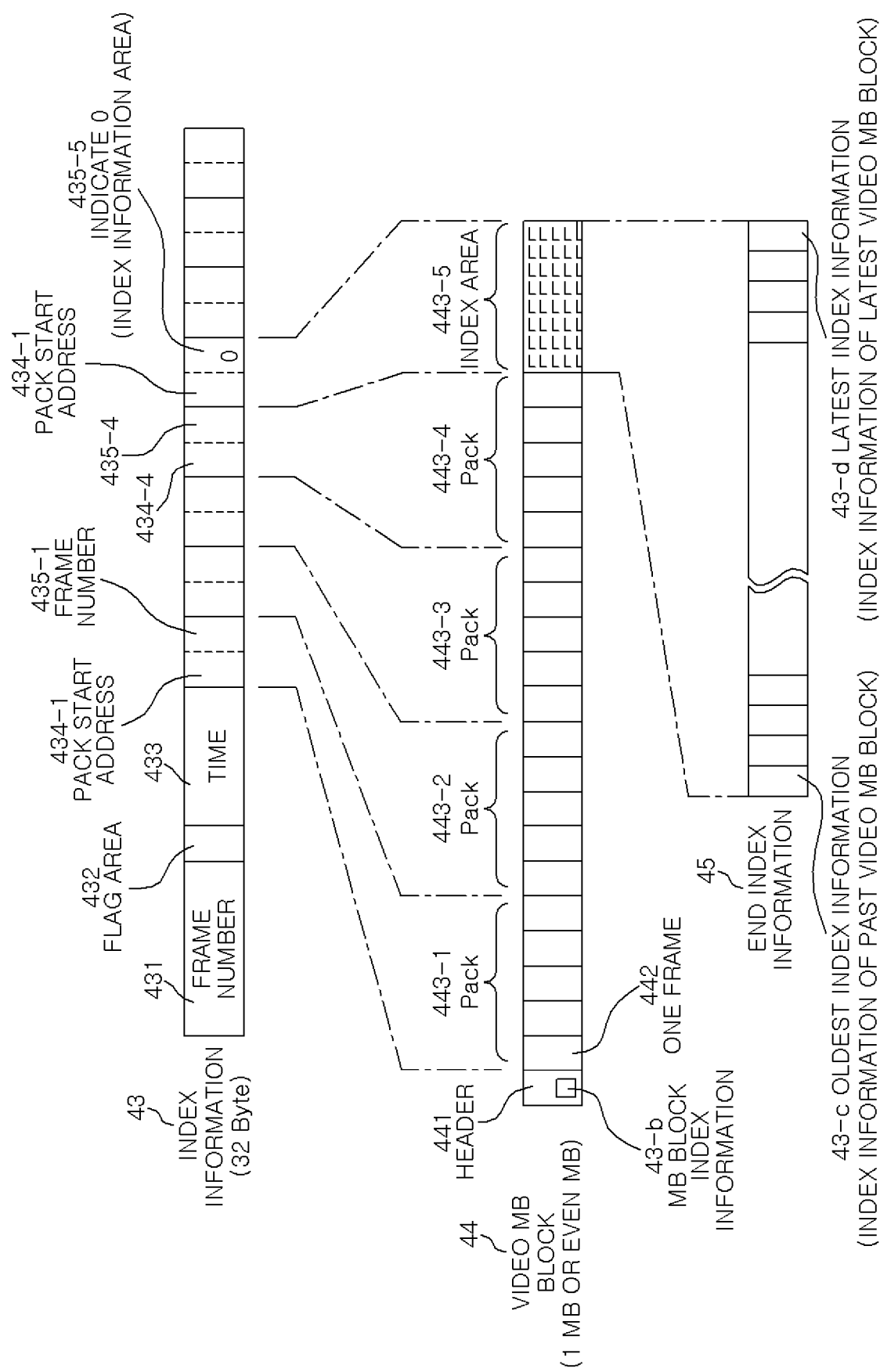
FIG. 6 is a diagram explaining a relationship between index information 43 of the recording device 15 and the video MB block 34.

FIG. 6 is a diagram illustrating a relationship between index information 43 of the recording device 15 and the video MB block 34.

Figure 4:
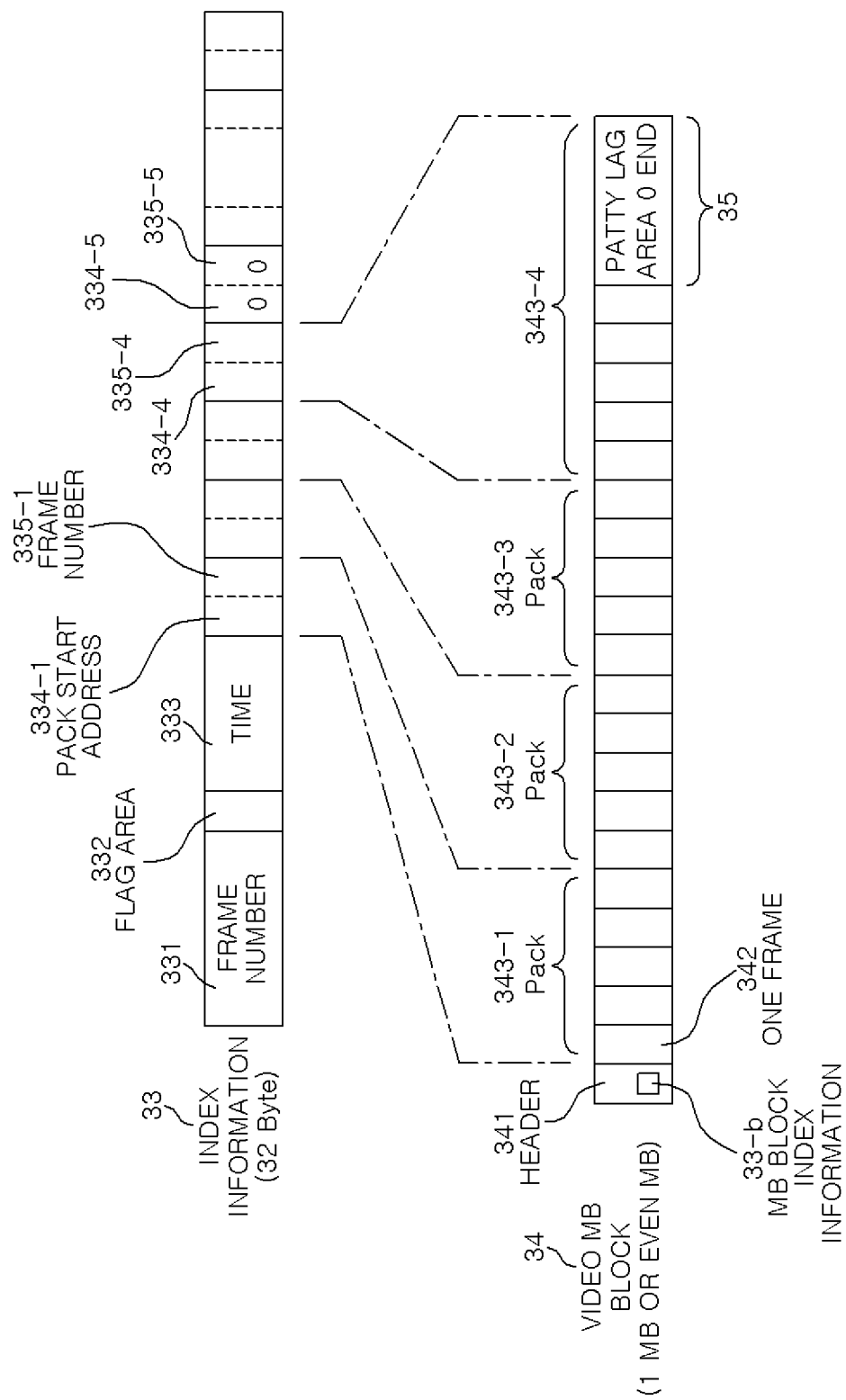
FIG. 4 is a diagram explaining a relationship between index information 32 and a video MB block 34 in the conventional video recording apparatus.

A difference between FIG. 6 and FIG. 4 is that an index area is provided at the end of the video MB block 44.

The index information 43 is index information of the video MB block 44, and one piece of the index information 43 is present for one video MB block 44. The index information 43 includes a start frame number 431, a flag area 432, a start frame time 433, pack start addresses 434-1 to 434-Q, and in-pack frame numbers 435-1 to 435-Q. Q is the maximum number of packs (to be described later) for each video MB block, and is set to 10 in this example.

The start frame number 431 indicates a frame number (accumulated frame number) of the first video data of the video MB block 44 to be paired. The accumulated frame number is a monotonically increasing value which is set to 0 when creating the video data area 42.

The flag area 432 stores a flag indicating a state. The state indicates whether the video MB block to be paired exists or whether the index information is a dummy value.

The start frame time 433 indicates a video time of the first video data of the video MB block 44 to be paired.

The pack start address 434 and the in-pack frame number 435 have a size of 1 byte (Octet), are arranged alternately, and indicate a relative pack start position in the video MB block and the number of frames, respectively. They indicate an address of a pack in the video MB block and the number of frames. The number of bytes of the pack is obtained by a difference between an address of the pack of interest and an address of the next pack.

Meanwhile, the video MB block 44 includes an MB block header 441, a plurality of frame data 442 and packs 443-1 to 443-5. The MB block header 441 holds index information 43-*b* of the video MB block having the same contents as the index information 43 and an accumulated MB block number.

The frame data 442 is one unit of the recorded video data, and is arranged after the MB block header 441 so as to be packed in the encoding order. The video MB block 44 is sub-blocked into about 10 areas. This sub-block is referred to as a pack 443. Sub-blocking is effective when reading the video data, especially for random access. A boundary of the pack 443 may be selected as much as possible to match a GOV boundary (I picture or IDR frame). Considering ease of control by a playback application, the pack may be simply defined by a fixed number of frames or based on time. In this case, the video MB block 44 may reach an upper limit of the number of packs without being sufficiently filled with the video data, and a large unused area may be left at the end.

Since the pack start address 434 is 8 bits, the boundary of the pack 443 may be selected only on the basis of 1/256 of the size of the video MB block. Further, since it is also subject to constraints of (physical) sector size, there may be a small unused area (not shown) at the end of the actual pack 443.

As a feature of this example, the index area 443-5 provided at the rear end of the video MB block 44 stores end index information 45.

The index area 443-5 is treated as one type of pack in the index information 43, and holds the corresponding pack start address 434-5. If the corresponding in-pack frame number 435 is "0," it indicates that the pack is the index area.

In an in-MB-block index area 45, a plurality of pieces of the index information 43 corresponding to a plurality of video MB blocks 44 are continuously arranged in the recording order.

The oldest index information 43-*c* positioned at the head is index information of the past video MB block, which is the oldest information stored in the in-MB-block index area 45. The latest index information 43-*d* positioned at the end is the latest index information stored in the in-MB-block index area 45.

In this example, the latest index information 43-*d* is index information of the latest MB block (i.e., the video MB block 44 itself) when creating the video MB block 44, and the oldest index information 43-*c* is the oldest index information within a range that can be stored in the in-MB-block index area 45. In this case, a value obtained by dividing the size of the in-MB-block index area 45 by the size (32 bytes) of one piece of index information represents the number of pieces of the index information 43 that can be stored in the in-MB-block index area 45.

Further, the index information 43-*d* has the same value as the index information 43-*b*. Therefore, when reading the video data, if the index information 43-*b* and the index information 43-*d* do not have the same value, it may be determined that the video MB block 44 is in an abnormal state in which data has been written only halfway.

In addition, at the end of the in-MB-block index area 45, an area less than 32 bytes (not shown) may be left.

Further, the index area 443-5 is not necessarily provided in every in-MB-block index area 45, and may be intermittently provided. The index area 443-5 may store index information of thousands to tens of thousands of video MB blocks 44, and sufficient redundancy can be ensured even if it is provided intermittently. As a result, the information corresponding to the conventional index information area 31 is distributed and redundantly recorded.

Figure 7:
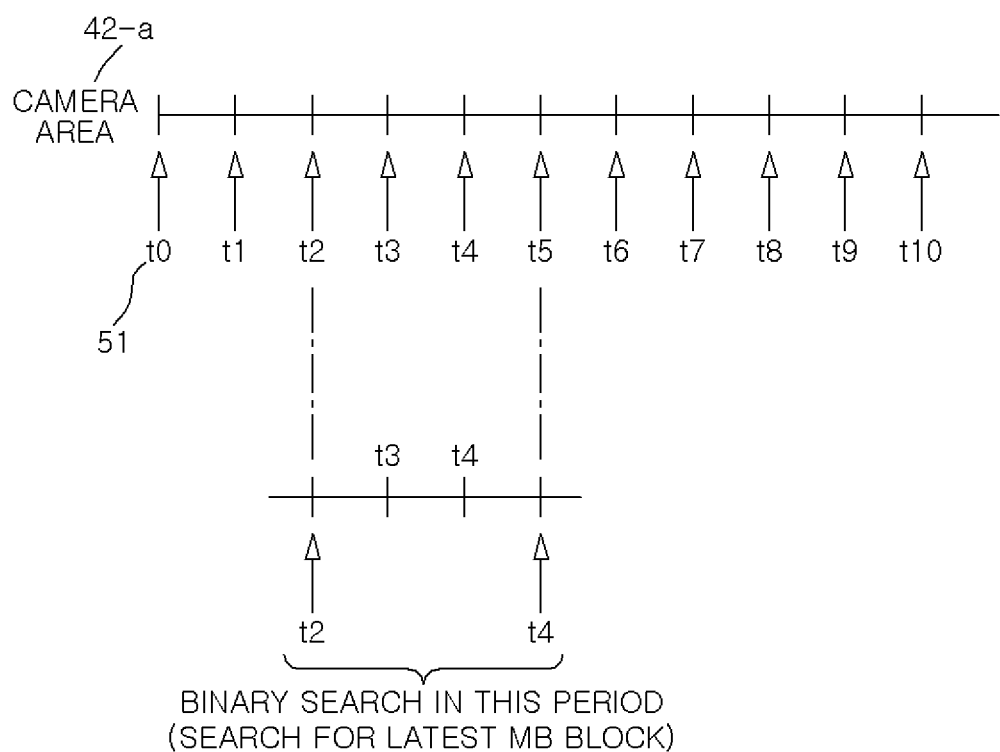
FIG. 7 is a diagram explaining the latest video search of the video recording apparatus according to the first embodiment.

FIG. 7 is a diagram explaining the latest video search of the video recording apparatus 1 according to the first embodiment. The video recording apparatus of the present embodiment, upon startup or restart, searches for the latest MB block from each camera area stored in the recording device and synthesizes index information corresponding to the conventional index information area 31 in the memory unit 12. Accordingly, it is possible to find out where the video data exists in the camera area and when the video data was recorded.

As a method of searching for the latest MB block, first, sampling points 51-*t*0 to 51-*t*10 are determined by equally dividing a video area 42-*a* of each camera into eleven sections. The sampling point 51 is aligned so as to indicate the head of the video MB block 44.

The eleven video MB blocks 44 are accessed from the recording device 15 based on the sampling point 51, and the index information 43-*b* of the video MB block in the header 441 is read out.

As a result, it is assumed that, for example, the frame number of the index information of t2 is the maximum. In that case, binary search is performed in a period from t2 to t5 to search for the maximum frame number (latest MB block).

The reason not to perform binary search between t2 (maximum) and t3 (minimum) is that the block at t3 has not been rewritten, and it is doubtful whether there is a maximum frame number in a period from t3 to t4. In the binary search in a period from t2 to t4, the first time becomes t3 and there is no meaning in doubting t3. For this reason, binary search is performed in the period from t2 to t5.

Figure 8:
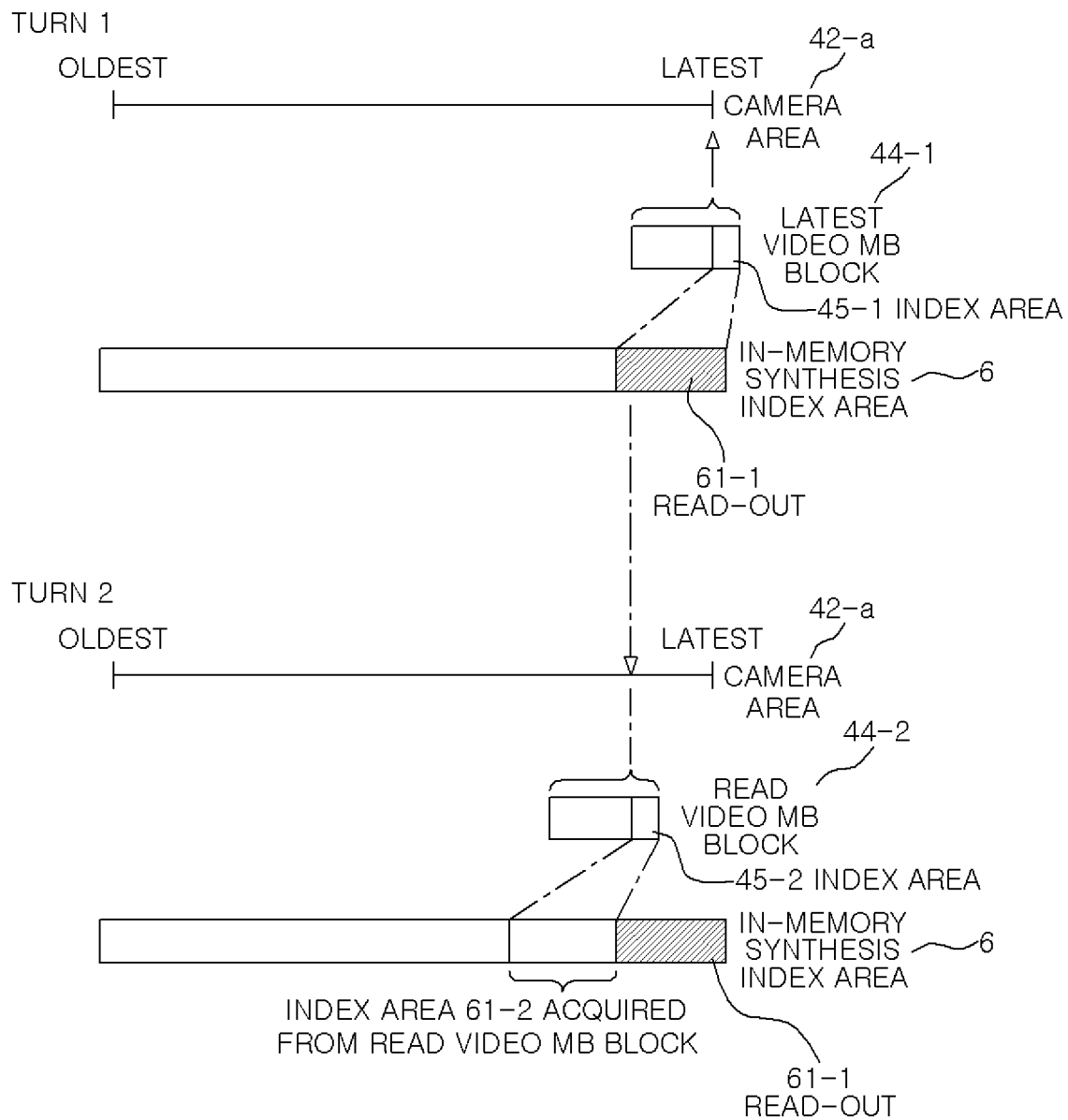
FIG. 8 is a diagram explaining the index information synthesis of the video recording apparatus of the first embodiment.

FIG. 8 is a diagram explaining the index information synthesis of the video recording apparatus 1 according to the first embodiment.

Turn 1 is executed after specifying the latest MB block. An address space 42-*a* indicated by a bar is obtained by cutting a ring-shaped recording structure of the camera area 42 at a position of the specified latest video MB block. The left end corresponds to the oldest video, and the right end corresponds to the latest video.

In Turn 1, a specified latest video MB block 44-1 is read from the camera area 42-*a* of the recording device 15. The latest video MB block 44-1 includes an in-MB-block index area 45-1 (hereinafter, simply referred to as an index area).

The index information of the index area 45-1 is written in a synthesis index area 6 provided in the memory unit 12, thereby obtaining a read-out index area 61-1.

Next, using the index information of the index area 61-1, the video MB block to be read in the next turn is selected. From the index information in the index area 61-1, the size of the index area included in the video MB block to be paired and the age of the index information 451 at the head of the index area are obtained, respectively. Through comparison, the video MB block having the oldest index information 451 is set as the video MB block to be read in the next turn.

In Turn 2, first, the video MB block selected in the previous turn is read out. The index area 61-2 is acquired from the index area 45-2 included in the read video MB block 44-2. Then, the index information is synthesized by writing the index area 61-2 to the in-memory synthesis index area 6.

This operation is repeated until it reaches the oldest.

That is, by writing the index information in the in-memory synthesis index area 6 while tracing back to the past from the index area of the latest video MB block, the index information for the camera area can be synthesized.

Figure 9:
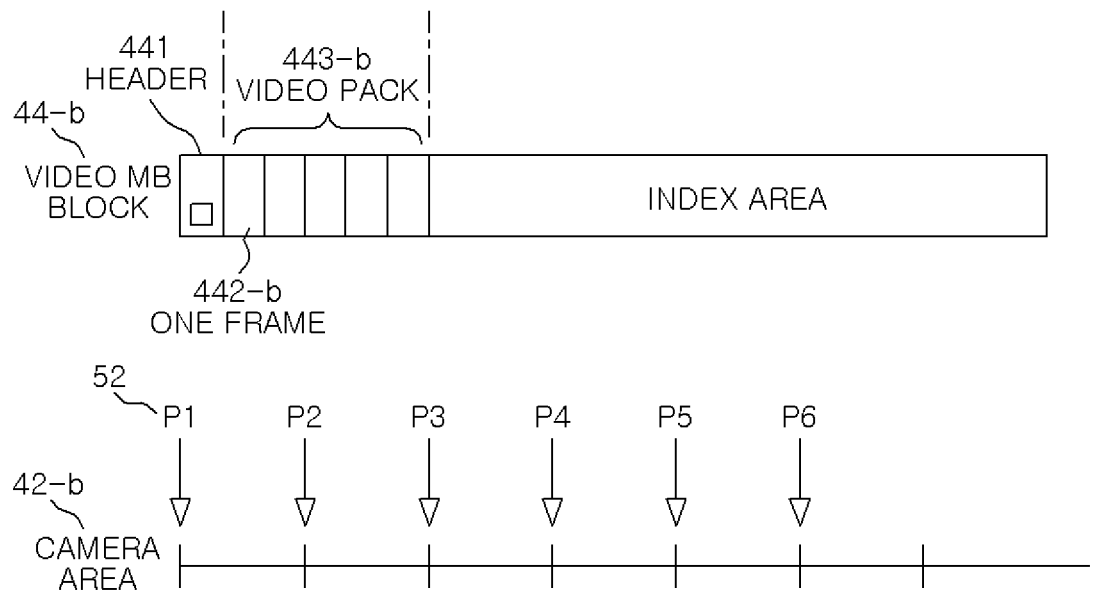
FIG. 9 is diagram explaining a speed-up of the recording device in the video recording apparatus according to the first embodiment.

FIG. 9 is a diagram explaining a speed-up of startup processing in the video recording apparatus 1 according to the first embodiment.

An index priority MB block 44-*b* includes a header 441, a video pack 443-*b* and an index area. In the normal MB block 44, the index area is arranged in the remaining area after storing about ten video packs 443. However, in the index priority MB block 44-*b*, one video pack 443 is set to mainly store the index information, and the remaining area is set as the index area. Besides, the entire index priority MB block 44-*b* may be set as the index area without the video pack 443.

This special index priority MB block 44-*b* is placed at a predetermined position within the camera area 42-*b*. For example, during video recording, the index priority MB block 44-*b* is placed at points 52-P1 to 52-P6 provided at regular intervals in the camera area 42-*b*. This interval depends on the number of pieces of the index information 43 that can be contained by one index priority MB block 44-*b*. As an example, it is preferable that the oldest index information in the index area of the index priority MB block 44-*b* of the point 52-P6 is at the point 52-P5. If the index priority MB block 44-*b* always contains 28672 pieces of the index information, the intervals of the point 52 also become 28672 (28672 pieces of the MB block 44).

As described above, the index priority MB block 44-*b* is written in the camera area 42-*b* with the minimum number required. Accordingly, the number of times of access to the recording device 15 when synthesizing the index information is reduced, and a speed-up can be achieved.

If any index priority MB block 44-*b* has been damaged, by switching to the method of tracing the normal video MB block 44 including the index area 443-5 as described in FIG. 8, the synthesis of the index information can be continued.

The video recording apparatus of the first embodiment can realize an improved circulating file system that does not require termination processing and keeps constant the time required for startup.

Second Embodiment

A video recording apparatus of a second embodiment is different from the first embodiment in that it explicitly includes management information such as an arrangement interval of the index priority MB block in each camera area.

Briefly, in the second embodiment, the management information of each camera area includes at least two values of an MB block number that stores the oldest video data when changing the capacity and an arrangement interval of the index priority MB block. The two values are calculated and stored when "new creation" or "capacity size change" of the camera area is performed.

Further, during video recording while a recording application is executed, by using the two values, it is determined whether it is a location for storing "index priority MB block." If it is a corresponding location, the index priority MB block is stored.

Thereafter, upon startup of the recording or playback application, the index priority MB block is read using the two values for each camera area to synthesize the index area of the camera area. Accordingly, a speed-up is realized by simplifying processing and reducing the number of times of reading of the recording device.

[Method of Calculating Arrangement Interval of Index Priority MB Block]

Table 1 shows a structure of management information for each camera area used in this example. The management information is held at a predetermined location of the recording device 15. An independent area such as the conventional index information area 31 may be provided. The management information may be included in the arrangement information area 40, or may be stored in the unused video MB block in the vacant area 42-4.

the base point is "accumulated MB block number" of the oldest MB block immediately after changing the size of the camera area.

The arrangement interval of the index priority MB block ("Interval_IndexMBBlock") is calculated when the capacity of the camera area is secured or when the capacity of the camera is changed, and it is stored in the management area of the camera area. Specifically, using the four or less equations in Table 1, it is calculated from the capacity of the camera area (NumOf_MBBlocks), the byte size of the MB block (MBBlock_Size) and the byte size of the index information (Index Size). However, the minimum value is 4.

The definition of tmp_IndexMBBlocks in Table 1 is intended to make the sampling point be an interval at which the oldest index information in the index priority MB block overlaps with the second previous index priority MB block. The reason for overlapping with the second previous index priority MB block is to enable the index information to be interpolated from the previous or next index priority MB block even if one index priority MB block is damaged.

The recording application executed by the CPU 10, when storing the video data, determines whether or not the recording destination is the index priority MB block by the following equation. However, symbol "%" indicates the remainder.

Determination value=((accumulated MB block number of current MB block−base point) % NumOf_MBBlock) % (Interval_IndexMBBlock)

When the determination value is 0, it is set as the index priority MB block.

TABLE 1

Figure 10:
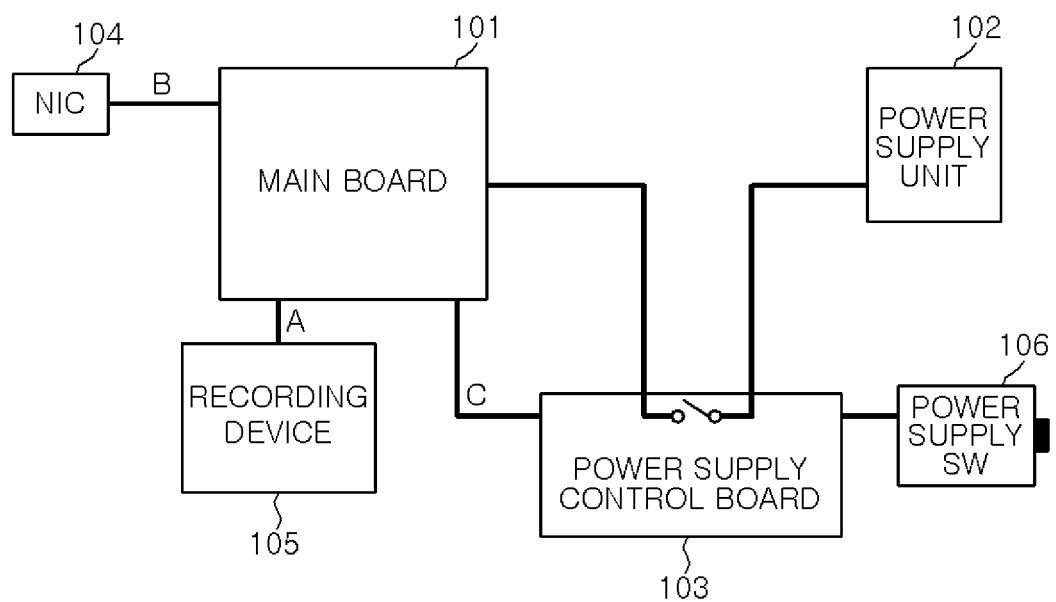
FIG. 10 is a configuration diagram of a video recording apparatus according to a third embodiment.

| Variable name | Meaning |
| --- | --- |
| MBBlock_Size | Byte size of MB block = 4 MB (value in this embodiment) |
| Index_Size | Byte size of index information = 32 Byte |
| NumOf_MBBlocks | Number of blocks for camera area capacity |
| NumOf_Index_in_IndexMBBlocks | Number of pieces of index information stored in index priority MB block = (MBBlock Size/2)/Index Size |
| tmp_IndexMBBlocks | Value during calculation: number of index priority MB blocks required to satisfy camera area in repetition of FIG. 10 = RoundUp(NumOf_MBBlocks/ (NumOf_Index_in_IndexMBBlocks/2)) |
| min_InitSamplingPoint | Minimum number of initial sampling points for latest value search in camera area = 4 |
| NumOf_IndexMBBlocks | Number of index priority MB blocks in camera area<br>if(min_InitSamplingPoint<tmp_IndexMBBlocks)<br>{<br>NumOf_IndexMBBlocks = tmp_IndexMBBlocks;<br>}else{<br>NumOf_IndexMBBlocks = min_InitSamplingPoint;<br>} |
| Interval_IndexMBBlock | Arrangement interval of index priority MB block |

In this embodiment, the index priority MB block is arranged at regular intervals within an arbitrary camera area, and its position is unchanged even if the recording circulates. The base point of the arrangement of the index priority MB block in the camera area is determined by the following rule.

When the size of the camera area has not been changed, the base point is 0,

When the size of the camera area is being changed,

When the determination value is other than 0, it is set as the video data MB block.

[Processing at Startup of Recording Application]

At startup or before startup of the recording application, by the recording application itself or the OS, a structure 12A of Table 1, an index area 12B of the camera area, and a flag array 12C indicating whether each index information of the index area of the camera area has been written are secured in the memory unit 12.

Thereafter, the following processes corresponding to turns in the first embodiment are executed.

[Process 1: Sampling at Startup]

At startup, the MB block is read at regular intervals from the base point. This process is called sampling at startup. The in-camera-area MB block number at the start of sampling at startup is called a sampling start point and is determined by the following equation.

Sampling start point="base point"% NumOf_MB-Block

If the base point is 0, the sampling start point is also 0.

Sampling is performed while satisfying ((Interval_Index-MBBlock)×i<number of MB blocks for camera area capacity) when i is a loop variable whose initial value is 0.

The in-camera-area MB block number that is read by sampling at i is called "sampling point i" and is determined by the following equation.

Sampling point $i$=(sampling start point+(Interval_IndexMBBlock)×$i$)% NumOf_MBBlock By referring to the arrangement information 40, the in-camera-area MB block number is appropriately converted into an in-device MB block number, an logical block address (LBA) or the like, and access to the MB block becomes possible. When all MB blocks at sampling points are empty (invalid), it is determined that the camera area has not been written yet.

The CPU 10 executing the recording application inspects the index information of the index area at the end of MB block every time the MB block is read out and stores it in the index area 12B of the camera area if the condition is satisfied. The inspection is conducted according to the following rule.

Definition (B): read MB block (Bi): index information of interest in the index area of at the end of (B)

(Ci): index information in "index area of the camera area" at the position corresponding to the index information (Bi)

(fi): flag value corresponding to (Ci) of "flag array of camera area"

(B_Accumulated MBBlock Number): accumulated MB block number of (B), which is stored in the header area of (B).

(Bi_Accumulated MBBlock Number): accumulated MB block number indicated by (Bi)

tmp_Bi=value indicating the storage position of (Bi) before (B), where the end of (B) in the index area is the index information of (B).

($Bi$_Accumulated MBBlock Number)=($B$_Accumulated MBBlock Number)−tmp_$Bi$.

Rule: When both of the following two conditions are satisfied, (Bi) is stored at the position of (Ci). In that case, let (fi) be 1.

[Base point]<=(Bi_Accumulated MBBlock Number), ((fi)==0) or (Accumulated frame number of (Ci)<Accumulated frame number of (Bi)).

Thus, each sampling point i indicates the index priority MB block at the time of recording, and the index information between the sampling points can be acquired by reading them. However, it is not yet known where is the latest.

[Process 2: Binary Search for the Latest MB Block]

In Process 2, similarly to the first embodiment, the latest MB block is binary searched for between the latest at the sampling point and the third sampling point after the sampling point. However, during this search, when reading the MB block, the index area at the end of the MB block is stored (overwritten and updated) as the index information of the camera area.

[Process 3: Search for Flag Array from Latest to Oldest]

When scanning the flag array and finding an unread part, the MB block of the corresponding part is read from the recording device, and the end index information 45 (if any) at the end of the MB block or the index information 43-$b$ of the MB block are stored as the index information of the index area of the camera area.

In the video recording apparatus according to the embodiment of the present invention, the MB block to be read by initial sampling is set as the index priority MB block, the reading of the index information is completed only by the initial sampling, and the subsequent processing can be performed on the memory. Accordingly, it is possible to reduce the number of times of access to the recording device and to further shorten the time from when the power supply is turned on again after the power supply is cut off to the start of recording.

Third Embodiment

In the first and second embodiments, when the power supply is turned off during recording, a buffer of the recording application or the like or a buffer of the OS loses the video data of several seconds held in the memory by delayed writing without writing it to the recording device.

A video recording apparatus according to a third embodiment further includes a configuration for speeding up the normal termination processing itself as compared to the first and second embodiments.

Figure 12A:
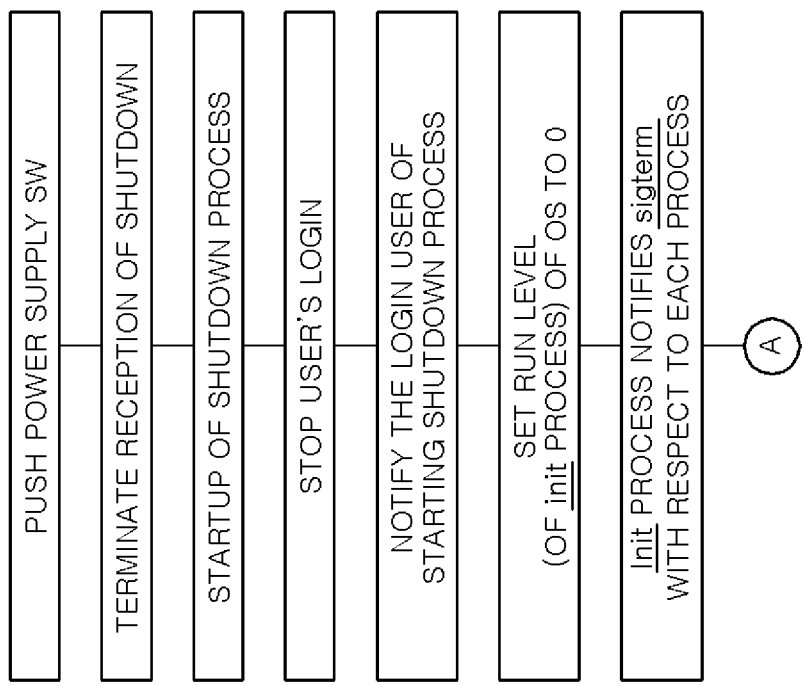
FIGS. 12A and 12B show a flow of termination processing of a conventional video recording apparatus.
Figure 12B:
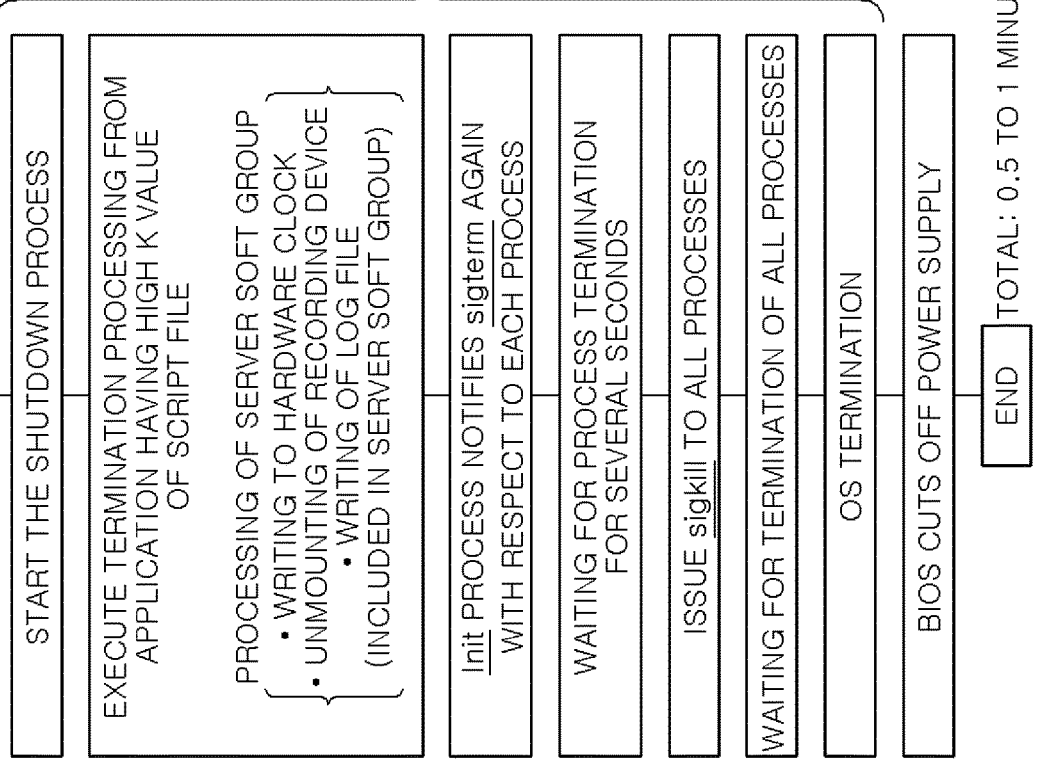

First, the reason it takes time to perform the normal termination processing will be explained. FIGS. 12A and 12B show a flow of normal termination processing in a POSIX type OS.

In a conventional recording apparatus, processes (applications) being operated by a real-time OS are terminated one by one, and the power is turned off after all applications are terminated. Processing to terminate all of these applications is time consuming. Each of an application for writing data to a recording medium and an application for writing a log is also one of the termination processes.

In the conventional recording apparatus, if the power supply is cut off during the termination processing, the power supply may be turned off before the application for writing data to a recording medium and the application for writing a log are terminated. Accordingly, after the restart, since the immediately previous data has not been written to the recording medium, there is no recorded data or data has been written only halfway, which may cause a problem such as data corruption and inconsistency with the data.

In the recording apparatus, writing to the recording medium and writing a log are most important, and other applications basically operate from the beginning upon restart even if they stop halfway, which may not cause a problem.

FIG. 10 shows a block diagram of the video recording apparatus of the third embodiment. The video recording apparatus of the present embodiment includes a main board 101 operating mainly for writing data to a recording medium, a power supply unit 102 for supplying power to the main board 101, a power supply control board 103 for controlling the power supply to the main board 101, a network control circuit 104 and a recording device 105 to which power is supplied via the main board 101, and a power supply SW 106. The main board 101 and the power supply control board 103 are connected via a serial communication path C or the like.

In the main board 101, a CPU is employed in a data processing unit for realizing multiple functions, and each data communication is performed using a system control hub (SCH). The CPU reads image data (digital data) sent from an imaging device via the network and stores it in the recording device. Further, the CPU transfers the data to the network control circuit 104 which controls transmission and reception of data by a transmission medium at a predetermined timing. The network control circuit 104 converts the formatted compressed image data into data reconstructed into a format compatible with a communication protocol of the network and sends it to the network.

The power supply unit 102 is a switching power supply or the like for converting the supplied AC power into a low voltage DC or the like. While receiving the AC power, the power supply unit 102 always supplies power to the power supply control board.

The power supply control board 103 is a board having a microcomputer, a display unit, switches and the like. The power supply control board 103 receives a command from the outside (user) and sends a termination processing command signal to the main board 101. Also, the power supply control board 103 cuts off the power supply to the main board 101 according to the termination processing signal form the main board 101 or the determination of the power supply control board 103 itself. Upon receipt of, e.g., an error notification signal or a termination processing signal from the main board 101, the power supply control board 103 notifies (displays) it to the outside.

The signal to be notified to the outside may be transmitted (displayed) from the main board 101, but in a standby state (state in which power is supplied, but it operates only with minimum electricity without functioning as a recording device), any notification cannot be made. Therefore, electricity is constantly supplied to the power supply control board 103, and the power supply to the main board 101 is completely cut off instead. Since the power consumption of the power supply control board 103 is almost the same as that of the power supply control board 103 in the standby state and power saving can be achieved, there is no problem in actual operation.

In order to cut off the power supplied to the main board 101, control from the microprocessor is necessary. However, since power is very small to cut off the power, a method of using a switch (latching relay) which receives a minute signal and mechanically opens and closes an electric path and a method of cutting off the power using a field effect transistor (FET) may be applied. The power supply may be cut off immediately upon receipt of the termination processing signal, or it may be delayed for a predetermined time with a timer.

The network control unit 104 receives digital data conforming to Ethernet (trademark) sent from the outside and sends it to the main board, as well as transmitting the digital data sent from the main board to the outside.

In addition to storing the image data transmitted via the network, the recording device 105 extracts data from itself and transmits the data to the main board 101 when image data is requested from the main board 101. The recording medium mounted on the present apparatus is an electronic recording medium.

The power supply SW 106 is a switch for notifying the video recording apparatus of startup or termination. Generally, the power supply SW of the recording apparatus terminates the application which the real-time OS of the main board 101 is operating and its own application by notifying the main board 101 of a power supply termination signal by an external action rather than physically cutting off electricity. A system call issued at that time is handed over to the BIOS and shifts the main board 101 to the standby state (waiting until the power supply SW is pressed next time to receive a startup signal).

FIG. 11 shows a flow of termination processing of the video recording apparatus of the third embodiment.

Also in the termination processing of this example, a script (rc script) corresponding to run level 0 is executed in step S16, but the contents of the script include only writing the system time to the hardware clock, unmounting the recording device, and (normally) terminating a logging process (e.g., syslogd). Here, if the video recording device 105 and a disk (partition) on which the log file is written are separate, unmounting and log writing may be performed at the same time, in no particular order. The unmounting usually includes a sync process that causes the cache to be written to the disk by a kernel.

Thereafter, in step S17, a termination processing completion notification is sent to the power supply control board 103 through a serial device (tty) or the like. This may be a simple telegram of several bytes. Further, a command for notifying termination processing completion may be written in the rc script.

If the termination processing completion notification is received by the power supply control board 103 in step S18, the power supply to the main board 101 is cut off in step S19. Even if the rc script is continued after the command for notifying termination processing completion of step S17, since the power is forcibly turned off, they will not be executed.

In the field of embedded OS, the disk (partition) of the system (OS) is often mounted read-only. In that case, even if the power is turned off without unmounting the system disk, there is no adverse effect.

Since it is possible to normally terminate the device in a short time, it is possible to reduce the work cost by reducing the time of work such as maintenance and repair, and to ensure improvement in reliability of the device and quality of the system.

INDUSTRIAL APPLICABILITY

The present invention can be applied to an apparatus for constantly recording data in a recording medium using a file system, and in particular, it is suitable for an in-vehicle recording apparatus or the like which suddenly cuts off the power supply or needs to be shut down safely in a very short time after notification of shutdown.

DESCRIPTIONS OF REFERENCE NUMERALS

1: video recording apparatus
2A to 2*m*: cameras
3-1 to 3-*n*: PC
20: network
10: CPU
11: internal bus
12: memory unit
13: network IF
14: recording device IF
15: recording device
101: main board 102: power supply unit
103: power supply control board
104: network control circuit
105: recording device
106: power supply SW

What is claimed is:

1. A video recording apparatus for recording video data from a plurality of video sources, comprising a recording device having a video data area and an arrangement information area,
wherein the video data area includes a plurality of blocks having the same size of 1 MB or more,
wherein the arrangement information area stores arrangement information indicating a location at which each block of the video data area is arranged on the video recording apparatus,
wherein each of the plurality of blocks stores video data of a plurality of frames, and some blocks among the plurality of blocks include an index area storing index information indicating an index of data stored in a respective block and indexes of data stored in a plurality of past consecutive blocks with respect to the respective-block,
wherein the video data area is divided for each of the plurality of video sources, and
wherein, upon startup or restart of the video recording apparatus, a latest block is searched for from the video data area, the index information in the index area of the latest block is read, and index information for the video data is synthesized by tracing back to the index information of past blocks from the index information of the latest block.

2. The video recording apparatus of claim 1, wherein the index area is provided at a rear end of the corresponding block or is provided using a remaining area having a size less than a predetermined size in the corresponding block.

3. The video recording apparatus of claim 2, wherein the video recording apparatus does not have index information other than the index information which is divided for each of the plurality of video sources and stored in a distributed manner over the index areas of the plurality of blocks, and restores all indexes of the plurality of blocks being used from the index information of the corresponding index area at each startup.

4. The video recording apparatus of claim 2, wherein the arrangement information area is managed by assigning index numbers to the plurality of blocks, and
wherein the video data area uses a part of the plurality of blocks defined by a predetermined rule as an index priority block, in which the index area is arranged preferentially, and unless the index priority block is broken, all indexes of the plurality of blocks being used in the video data area are restored by reading only the index priority block.

5. The video recording apparatus of claim 2,
wherein the index area is provided for each of the divided video data areas in a plurality of blocks.

6. The video recording apparatus of claim 1,
wherein the index area is provided for each of the divided video data areas in a plurality of blocks.

7. The video recording apparatus of claim 6, wherein the video recording apparatus does not have index information other than the index information which is divided for each of the plurality of video sources and stored in a distributed manner over the index areas of the plurality of blocks, and restores all indexes of the plurality of blocks being used from the index information of the corresponding index area at each startup.

8. The video recording apparatus of claim 6, wherein the arrangement information area is managed by assigning index numbers to the plurality of blocks, and
wherein the video data area uses a part of the plurality of blocks defined by a predetermined rule as an index priority block in which the index area is arranged preferentially, and unless the index priority block is broken, all indexes of the plurality of blocks being used in the video data area are restored by reading only the index priority block.

9. A video recording method of a video recording apparatus including a recording device having a video data area and an arrangement information area, the method comprising:
setting the video data area to include a plurality of blocks having the same size of 1 MB or more;
storing arrangement information indicating a location at which each block of the video data area is arranged on the video recording apparatus in the arrangement information area; and
storing video data of a plurality of frames in each of the plurality of blocks, and setting some blocks among the plurality of blocks to include an index area storing index information indicating an index of data stored in a respective block and indexes of data stored in a plurality of past consecutive blocks with respect to the respective block, and
wherein, upon startup or restart of the video recording apparatus, a latest block is searched for from the video data area, the index information in the index area of the latest block is read, and index information for the video data is synthesized by tracing back to the index information of past blocks from the index information of the latest block.

* * * * *